May 13, 1930.　　　　E. M. WILCOX　　　　1,758,018
CONTROL MEANS FOR RAILWAY SWITCH MECHANISM
Filed Sept. 23, 1926　　　2 Sheets-Sheet 1
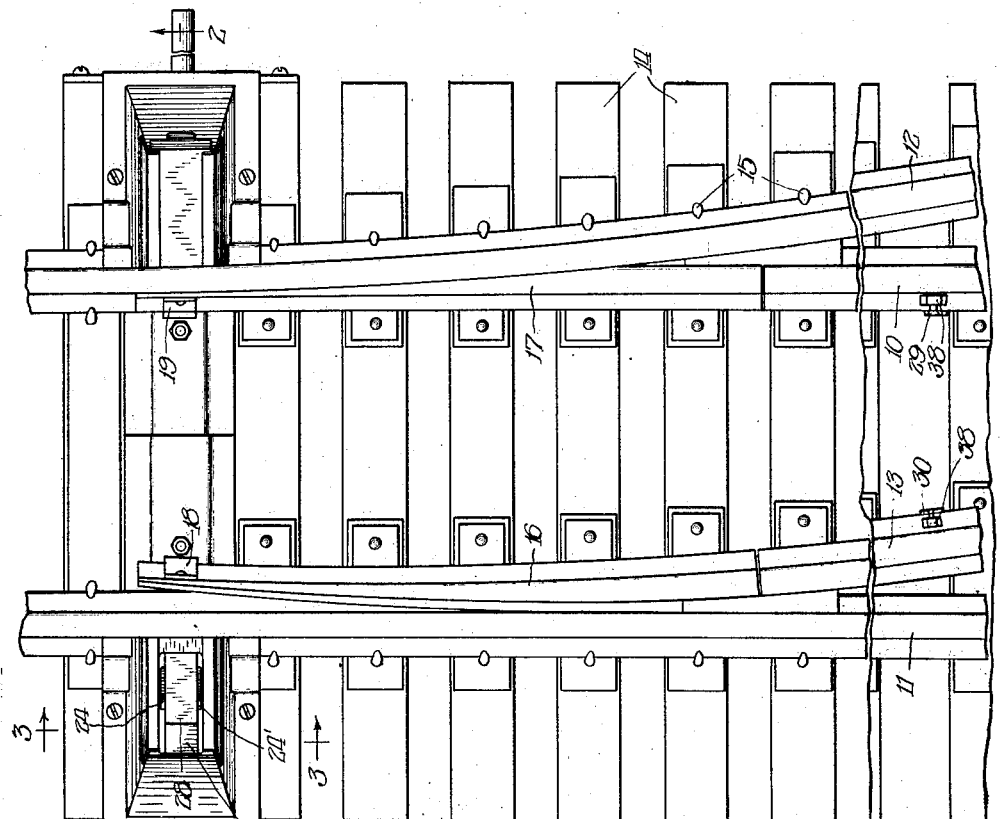
Witness:
R. Burkhardt.
Inventor:
Edgar M. Wilcox,
By Wilkinson, Huxley, Byron & Knight Attys May 13, 1930.  E. M. WILCOX  1,758,018
CONTROL MEANS FOR RAILWAY SWITCH MECHANISM
Filed Sept. 23, 1926  2 Sheets-Sheet 2
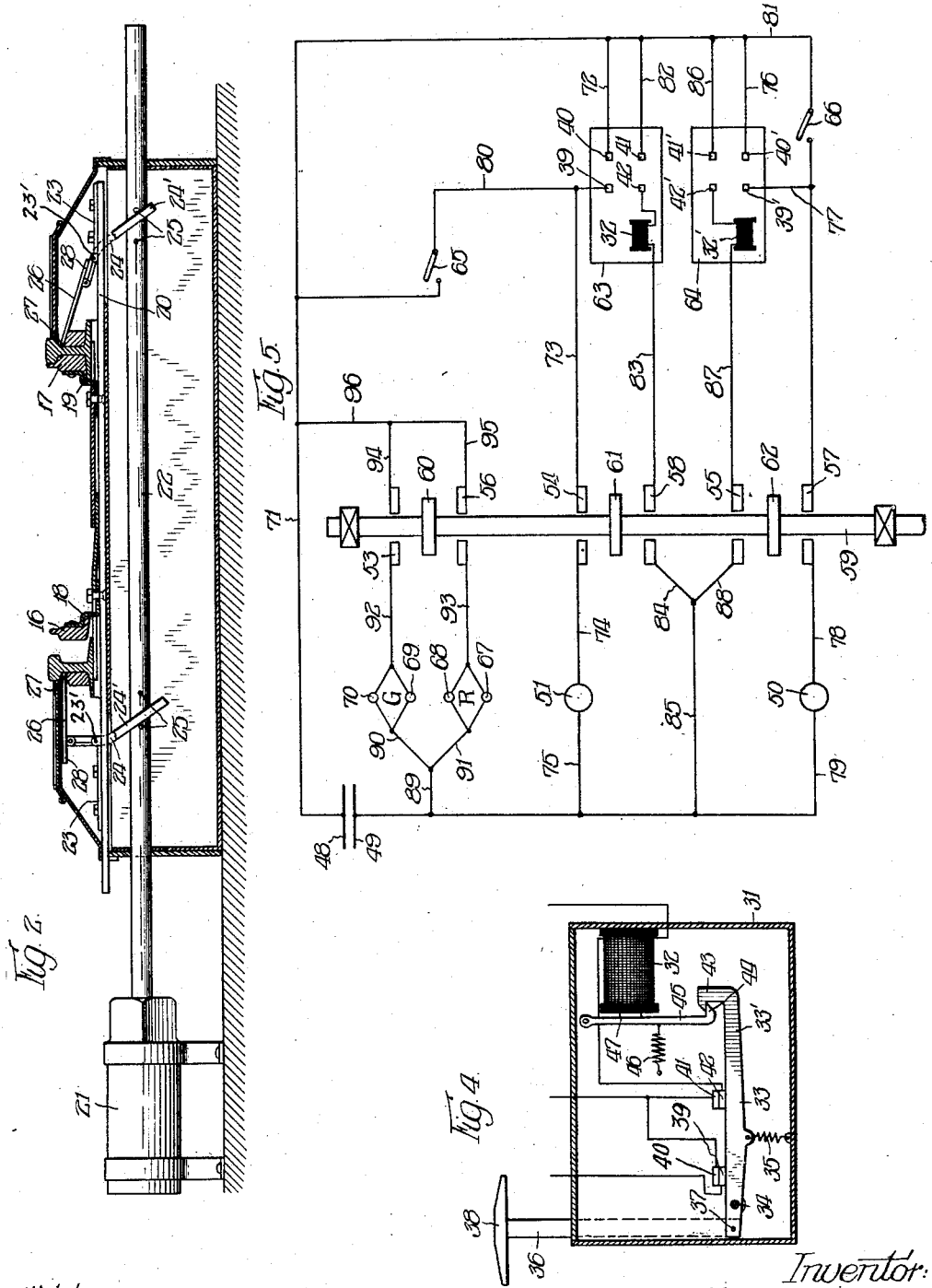
Witness:
R. Burkhardt.
Inventor:
Edgar M. Wilcox,
By Wilkinson, Huxley, Byron & Knight
Attys.

Patented May 13, 1930

1,758,018

UNITED STATES PATENT OFFICE

EDGAR M. WILCOX, OF HAMMOND, INDIANA

CONTROL MEANS FOR RAILWAY-SWITCH MECHANISM

Application filed September 23, 1926. Serial No. 137,191.

My invention relates to improvements in control means for railway switch mechanism and more particularly to control means adapted to be influenced by a vehicle traversing one of a plurality of associated tracks forming the switch assembly, and to control a switch operating means, to cause the switch points to be properly positioned to receive the vehicle.

My improvement has a particular advantage when used in conjunction with the locking type of switch operating means, although it may be applied to any type of switch with a high degree of usefulness.

Railway switches generally embody two movable switch points placed in operative relationship with a main track and an associated branch track, the arrangement embodying a single main track branching to form two tracks and assuming in its general formation the shape of the letter Y. This is mentioned for the reason that the following description will be more readily understood by referring to that portion of the main track which represents the stem of the Y as the stem track of the switch and the remaining portions of the track as arm tracks of the switch, the stem track and one arm track forming the main track whereas the other arm track forms the branch track. The movable switch points are generally positioned in operative relationship with the main track and the branch track by a suitable mechanical connection adapted to impart the desired movement to the switch points, the operation being effected by a manually operated lever or other mechanism serving as a source of power. In such a structure, a train or other vehicle approaching the switch upon one of the arm tracks, will, in the event the switch points are positioned to complete the track along the other arm, force a movement of the switch points to the opposite position by thrust imparted to the switch points by the vehicle wheels, tending to render the switch properly positioned to receive the vehicle with the result that the parts are sometimes ruptured. In view of the danger and insecurity occasioned by switches which can be moved by forces applied to the switch points and to the rupture of switches, improved switch mechanisms have been devised which eliminate this possibility and which can only be thrown through the instrumentality of the operating mechanism provided, and which must therefore be provided with means for controlling the position of the switch points to properly receive a train or other vehicle approaching the switch on either one of the arm tracks, in order to avoid accidents when the switch points are positioned to complete the other track.

To this end, one of the objects of my invention is to provide a means, positioned to be operated by the vehicle traversing one of the associated tracks of railway switch mechanism, to control the position of the switch points so that the switch points will always be in a position to properly receive the vehicle.

A further object of my invention is to provide an automatic means comprising separate means positioned adjacent each of the arm tracks of a railway switch assembly, each being connected to control an operating means for the switch points whereby a vehicle approaching the switch on either of the arm tracks will cause an operation of the particular control means to influence the operating means to control the position of the switch points in a manner to properly receive the vehicle.

Another object of my invention is to provide a control means for switch mechanism provided with an operating means such as an electric pneumatic motor or a straight electric motor or any similar mechanism, the control means being electrically connected to the operating means whereby the operation of the control means will have a definite effect on the operating means to control the position of the switch points.

Another object of my invention is to provide a system for controlling railway switch mechanism having an operating means for the switch points and embodying a pair of electrical contacts associated with the arm portion of the main track and a pair of electrical contacts associated with the branch track, each connected to the operating means by means of a separate circuit, each circuit containing a circuit switch movable with the switch points, and a source of current, said circuit switch being adapted to connect and disconnect alternately, by the movement of the switch points, each of the above described circuits, such connecting and disconnecting serving to connect for operation the pair of electrical contacts, which are associated with the track that is open or incomplete by virtue of the position of the switch point.

Another object of my invention is to provide a device of the type described in the above stated objects, in which there is a second electrical switch movable with the switch points hereinafter called the locking circuit switch, which serves to energize and deenergize alternately the coils of two locking devices, the locking devices serving to lock the control means for the pairs of electrical contacts in a position out of the influence of the vehicle, so that when a particular control means has been operated by a passing vehicle to throw the switch points to a new position, the locking circuit switch is moved into a position to energize the locking coil of the particular operated control means whereby the control means is held in a position out of the influence of subsequently passing vehicles as long as the switch points remain in the new position.

Another object of my invention is to provide a control means embodying a plurality of manually operable control switches connected for operation in conjunction with automatic control means of the type set forth in the above stated objects and in which each of the manually operable control switches is adapted to cause the operating means for the switch points to move the switch points in a given direction, the circuits for the manually operable switches being likewise alternately connected for operation and disconnected by the circuit switch above referred to movable with the switch points, a particular position of the switch points causing, through the circuit switch, a connection of the manually operable control switch that will operate to move the switch points to the opposite position.

Another object of my invention is to provide an improved signal system to be used in conjunction with the above described control means in which a third switch is provided movable with the switch points hereinafter called the signal circuit switch, whereby one of two circuits is connected with the source of current, depending upon the position of the switch points, to indicate by use of different colored lights, connected in the two circuits, the position of the switch point.

These and other objects are accomplished by means of the arrangement disclosed on the accompanying sheets of drawings, in which—

Figure 1 shows a plan view of a railway switch mechanism provided with a locking type of operating means and equipped with my improved control device;

Figure 2 is a cross-sectional elevation of the switch operating means shown in Figure 1 and taken on the line 2—2 in Figure 1;

Figure 3 is a cross-sectional end elevation of the switch operating means taken on the line 3—3 of Figure 1;

Figure 4 is a side elevation partly in cross-section and partly diagrammatic, representing one of the control devices having pairs of contacts adapted to be operated by a passing vehicle, this figure disclosing a shoe adapted to contact the wheel of the vehicle, and a locking coil for holding the shoe in depressed position; and Figure 5 is a wiring diagram, showing the manner of connecting the various elements comprising my system.

The various novel features of the invention will be apparent in the following description and drawings and will be particularly pointed out in the appended claims.

Referring to the drawings, it will be noted that my invention is adapted to be applied to a switch mechanism embodying a main track consisting of rails 10 and 11 and a branch track consisting of rails 12 and 13, these rails being suitably positioned on ties 14 fastened by spikes 15 and having associated therewith in operative relation, the movable switch points 16 and 17. The forward ends of the switch points are connected by brackets 18 and 19 to a transversely movable member 20. Positioned to one side of the track in the same lateral plane as the transversely movable member 20, is the operating means designated generally 21, adapted to reciprocate so as to move the lower transversely movable member 22. This operating means may be of any desired type such as a compressed air piston and cylinder engine provided with electrically controlled admission ports or an electrical motor or any other means capable of being controlled and suitable for reciprocating the transversely movable member 22. Positioned on the upper face of the transversely movable member 20 at each end thereof, are brackets 23 provided with pivots 23' at their inner ends, serving as mountings for the lever elements 24. The levers 24 are provided with depending arms 24' positioned between pins 25 attached to the transversely movable member 22 in such a manner that movement of the member 22 effects a movement of member 20. Pivoted to the upper arm of the lever elements 24 are links 26 forming a part of a toggle construction and having their inner ends seated against the outer face of the rail as at 27. The outer ends of the links 26 are extended to form abutments 28 adapted to form stops for the toggle mechanism in a straight line position so that when the toggle link is in the position shown at the right hand side of Figure 2 in the drawing, the link 26 and the upper arm of the lever 24 form a straight bracing rod between the stationary rail and the transversely movable element 20, serving to resist any thrust tending to move the switch points to the left as shown in this figure. In such a structure it is only possible to move the switch points by moving the transversely movable element 22, which acts first to break the straight line position of the toggle bracing rod. The structure and operation of the above described switch mechanism form the subject matter of my co-pending application No. 131,333 filed August 25, 1926, and are therefore only briefly described here.

My invention contemplates mounting a control device, such as shown in Figure 4, adjacent one of the rails of each of the arm portions of the track, such as shown at 29 and 30 in Figure 1. The control device comprises a casing 31, having mounted therein a solenoid 32 and a lever 33 pivoted as at 34, held by spring 35 normally with arm 35' down. Extending through the top of the casing 31 is a rod 36 pivotally connected at 37 to the other arm of the lever 33, this arm being usually in elevated position. Mounted on the upward end of the rod 36 is a contact plate 38 adapted to be engaged and depressed by the flange of a wheel of a vehicle, the device being so positioned that the plate 38 is disposed on the inside and close to the upper surface of the rails 10 and 13, as shown in Figure 1. Inside the casing 31 are two pairs of contact points 39, 40, 41 and 42, formed of suitable spring metal and positioned over the arm 33' of the lever 33 so that when the lever is moved upwardly by a downward thrust on the plate 38 the two pairs of contacts are bent to engage so that each pair completes an electrical circuit. The end of the lever 33 is provided with a hook portion 43 adapted to be engaged by the lip 44 on the pivoted link 45, the pivoted link being biased to the left hand position, when the solenoid 32 is not energized by spring 46 but positioned to be influenced by the solenoid 32 when it is energized so as to be moved and held to the right as shown in Figure 4.

Referring to Figure 5, 48 and 49 represent the two terminals of a source of current such as service lines or the like which constitute the source of operating current for the various devices in my system. Numbers 50 and 51 represent two electrically controlled valves for the operating means employed to move the switch points shown in the other figures and designated 21. It is to be understood that means 50 and 51 herein called valve means, represent means each for effecting movement of rod 22 in one direction and being subject to electrical control of operation. Number 52 represents generally a multiple electrical switch provided with six sets of terminals, shown at 53, 54, 55, 56, 57 and 58, provided with a movable rod 59 having three circuit completing or making elements 60, 61 and 62 mounted thereon. This multiple switch is provided with a mechanical connection between the transversely movable member 22 and the pivoted rod 59 so that for each position of the switch points one or the other groups of terminals positioned adjacent the rod 59 is connected to complete their respective circuits by contacting the elements 60, 61 and 62, it being understood that no neutral position can be effected as long as the switch points are completely thrown. The circuit completing elements are either in contact with the terminals on the upper side or in contact with the terminals on the opposite side. Designated generally as 63, 64, are two control devices of the type above described and as shown in Figure 4, the four terminals being represented by the reference characters 39, 40, 41 and 42 in the control device represented at 63 and by reference numerals 39', 40', 41' and 42' in the control device represented at 64. Two manually operable control switches 65 and 66 are connected to influence the operating means each forming a short circuit to cut out the automatic control device and to energize to the valves of the operating means.

Two signal lights 67 and 68 are connected in parallel for indicating one position of the switch points and two similar signal lights 69 and 70 are similarly connected for indicating the opposite position of the switch points. Two lights indicating a single position are used in preference to one, for the reason that one light is positioned opposite the railroad track to be viewed by the operator of an approaching vehicle and the other set of lights is located in the position to be readily viewed by the operator of the manually operable switches 65 and 66. Electrical wires form the connections for these various elements, the arrangement being shown in the wiring diagram in Figure 5. One of the operating circuits in my device comprises wires 71 and 72 extending from the terminal 48 of the source of current, contact points 40 and 39, wire 73, switch 54, wire 74, controlling valve 51, and wire 75 completing the circuit, it being connected to the other terminal 49 of the source of current. A similar circuit is provided for the other control device which comprises wires 71 and 76, contact points 40' and 39', wire 77, switch 57, wire 78, operating valve 50 and wire 79. The first of these circuits is provided with a short circuit connection comprising the wire 80 and the manually operable switch 65, the second circuit being provided with a short circuit connection 81 likewise containing the manually operable switch 66. Two additional circuits are provided for operating a locking means, the first of which comprises the wires 71 and 82, contact points 41 and 42, the solenoid 32, wire 83, switch 58, and wires 84 and 85, the second of these two additional circuits comprising wires 71 and 86, contact points 41' and 42', solenoid 32', wire 87, switch 55, and wires 88 and 85. The means for operating the light signalling device comprises two circuits, each one operating to indicate a different position of the switch points, the first comprising the wires 71, 96 and 94, switch 53, wire 92, light 70, and wires 90 and 89. In this circuit there is also provided a second light 69 connected in parallel with light 70. The other light circuit comprises wires 71, 96, 97, the switch 56, wire 93, lights 67 and 68 connected in parallel and wires 91 and 89. It is to be noticed that the six sets of switch contacts 53, 54, 55, and 56, 57, 58 are so arranged relative to each other that the connecting and disconnecting operation may be accomplished by a single operating rod such as 59 having mounted thereon the circuit making elements 60, 61 and 62 so disposed that movement of the rod to one extreme position will effect a connection of one of the groups of three of the switch contact points and the other extreme position a connection of the other group of three contact points. Attention is called here, to the fact that contact points 57 and 54 with the circuit making elements 61 and 62 constitute the circuit switch above referred to and the contact 53 and 56 and circuit making element 60 constitute the said signal circuit switch, whereas the contacts 55 and 58 together with circuit making elements 61 and 62 constitute the above mentioned locking circuit switch.

In operation the vehicle operated control device designated generally 63, in Figure 5, is positioned in associated relationship with the branch track and adapted upon operation to throw the switch points to a position to complete the branch track. The vehicle operated control device designated generally as 64 is positioned in associated relationship with the arm portion of the main track and operates to throw the switch points to a position to complete the main track. The operating means designated 51 is of a type to cause the switch points to move to a position to complete the branch track whereas the operating means 50 is of a type to effect the reverse movement or such that will move the switch points to complete the main track. The connection between the switch operating rod 59 and the switch points is such that when the switch points are in a position to complete the main track the contact points 53, 54 and 55 are connected and vice versa when the branch track is completed by virtue of the position of the switch points the switch contacts 56, 57 and 58 are connected. In the diagrammatic showing the operating means 50 and 51 represent any suitable mechanism such as an electric motor or a valve of a pneumatic mechanism for throwing the switch points. For the purpose of this illustration it can be considered that the elements 50 and 51 represent valve means for a pneumatic mechanism which when energized will permit the introduction of the fluid to the mechanism which will cause the movement of the switch points. When the air valve is once energized the pneumatic mechanism will operate of its own accord and will shut itself off. The showing in this diagram of the vehicle operated control device 63 and 64 is similar to the structure and arrangement shown in Figure 4. Consequently when the lever 33 is operated by a passing vehicle the contact points 40 and 41 connect with contact points 39 and 42 respectively and the same manner of operation occurs in the control device 64. By virtue of this system and assuming that the switch points are in a position to complete the main track when a vehicle is approaching the switch on the branch track, the control switch associated with this track will automatically throw the switch points to complete the branch track in order to properly receive the vehicle. When the main track is complete the contact points 53, 54 and 55 are connected to complete their corresponding circuits, thereby effecting the lighting of the green signal lights 69 and 70, and a partial closing of the circuit containing the operating means 51, so that when the vehicle contacts the control device 63, the contact points 40 and 41 will connect with the points 39 and 42 respectively, serving to energize the electric valve means 51 to cause the switch points to be moved to the other position. Upon movement to the new position, the points of the contacts 56, 57 and 58 are connected, the contacts 57 serving to close the gap in the circuit containing the operating valve 50 and rendering it subject to operation in the event the control means 64 is operated by a vehicle traversing the main arm of the track. When the switch points have been thrown as above described, the circuit making element 60 serves to connect the contact points at switch 56 to light the other set of signal lights so as to indicate the new position of the switch points. Assume once more that the switch points are in a position to complete the main track, in which event the contact points 53, 54 and 55 will be connected. When in this position, the vehicle traversing the branch track will influence the control means 63 to cause contact point 40 to engage contact point 39, this serving to complete the circuit and to cause the switch points and the operating switch rod 59 to move to the new position. Upon reaching the new position, the circuit making element 61 closes the switch 58. During this time contact points 41 and 42 have been moved together by the influence of the passing vehicle in the same manner as points 39 and 40, so that a circuit will be closed and the solenoid 32 energized, in which event the operating rod 36, as shown in Figure 4, will be locked in depressed position by means of the link 47 being drawn over by the solenoid to cause the lip 44 to engage the lug 43 on the lever 33. This arrangement forms a locking device for maintaining the control means 63 in a position out of the influence of passing vehicles on the branch track as long as the switch 58 remains closed, or in other words, as long as the switch points are already in a position to receive a vehicle traversing the branch track. The locking device provided on the control means 64 is similar to that just described with the exception that the locking circuit switch 55 is maintained closed when the switch points are in the position opposite to that just described. It can be readily understood that the moment the switch points are moved the locking device on the track which is rendered open or incomplete by the new position of the switch points will release the lever 33 of the particular control device so that it will be in a position to throw the switch point back to the proper position by a vehicle traversing the particular track.

Manually operable switches 65 and 66 are positioned together in a suitable location and serve to control the operating valves to cause the switch point to move at the will of the operator. As shown in the diagram in Figure 5, in the event that the switch points are in a position to complete the main track the switch 54 is closed. The closing operation of the switch 55 will then energize the valve operating means 51 which will be effective to throw the switch points to a position to complete the side track. When the switch points are already in a position to complete the side track, the switch 54 is open and consequently manipulation of the manually operable switch 65 is ineffective. A similar operation is effected by manually operable switch 66 only for the reverse movement of the switch points, this switch serving to connect valve operating means 50 which operates to throw the switch points to a position to complete the main track.

I claim:

1. In railway switch mechanism, means for automatically throwing the switch to properly receive a vehicle, comprising operating means for the switch points and control means for said operating means adapted to be operated by a vehicle traversing one of a plurality of associated tracks, said control means being connected and disconnected with said operating means by an electric switch movable with said switch points, and an electric locking device for said control means connected to said electric switch movable with said switch points, whereby when said switch points are thrown, under the influence of said control means as effected by a traversing vehicle, said electric switch movable with said switch points is moved to connect said locking device to cause said locking device to lock said control means in a position out of the influence of traversing vehicles as long as the switch points remain so positioned.

2. In a railway switch mechanism, control means comprising a circuit containing in series a source of current, an electrically influenced device for moving the switch points, a switch adapted to be opened for one position of the switch points and closed for the opposite position of the switch points, and a second switch associated with one of a plurality of associated tracks and adapted to be closed by a vehicle traversing said track, and a locking means for maintaining said second switch closed when movement of said switch point is completed.

3. In a railroad switch mechanism, a control means, comprising an electrically influenced device for throwing the switch points and means automatically operable by a passing vehicle for energizing said means to operate said switch points, when said switch points are in a predetermined position, and a circuit containing a locking device for said automatically operable means, adapted to be energized when said switch points have been moved in a predetermined position.

Signed at Hammond, Indiana, this 18th day of September, 1926.

EDGAR M. WILCOX.